United States Patent
Ygfors

[15] 3,690,705
[45] Sept. 12, 1972

[54] HEAT INSULATING DEVICE FOR FASTENING TWO METALLIC MEMBERS OR OTHER OBJECTS TO EACH OTHER

[72] Inventor: Goran Ygfors, Sollentuna, Sweden
[73] Assignee: Ygfors Trading AB, Jarfalla, Sweden
[22] Filed: March 4, 1970
[21] Appl. No.: 16,547

[30] Foreign Application Priority Data
March 7, 1969 Sweden ..................3147/69

[52] U.S. Cl..................................287/20.3, 306/20
[51] Int. Cl................................................F16b 1/00
[58] Field of Search..........85/70, 82, 67; 287/20.3 X; 16/116 R X; 401/3

[56] References Cited

UNITED STATES PATENTS

| | | | |
|---|---|---|---|
| 1,833,002 | 11/1931 | Smith | 16/116 U X |
| 2,001,538 | 5/1935 | Mueller et al. | 16/116 U X |
| 3,014,563 | 12/1961 | Bratton | 85/70 |
| 3,319,918 | 5/1967 | Rapata | 85/82 X |
| 3,473,766 | 10/1969 | Poole | 85/82 X |
| 3,141,087 | 7/1964 | Schoenwald | 219/233 |

FOREIGN PATENTS OR APPLICATIONS

882,852 11/1961 Great Britain.................85/82

Primary Examiner—Andrew V. Kundrat
Attorney—Silverman & Cass

[57] ABSTRACT

A device for rigidly connecting two metallic members together in heat-insulating condition. A non-metallic bushing with a central passageway is positioned within a hole provided in at least one of said members and a screw or like fastener is positioned through the passageway adjacent the hole to expand the bushing within the hole. In one embodiment, the screw is secured directly to the second member and in another embodiment the bushing is expanded within the holes in both members thereby effecting the rigid connection.

4 Claims, 7 Drawing Figures

Patented Sept. 12, 1972  3,690,705
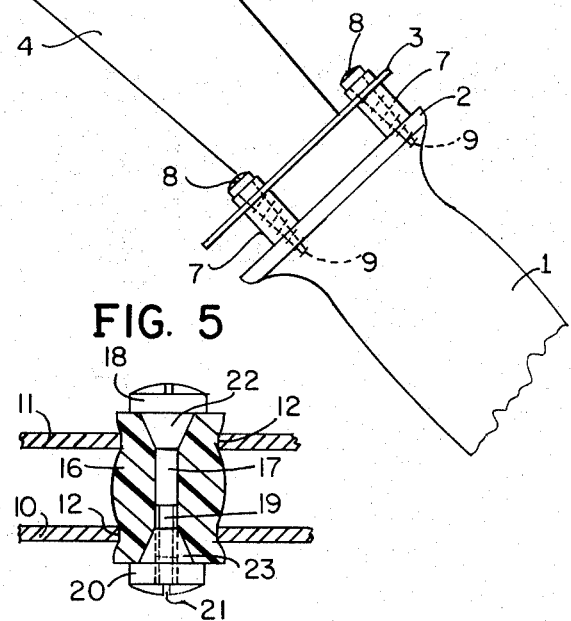
FIG. 1
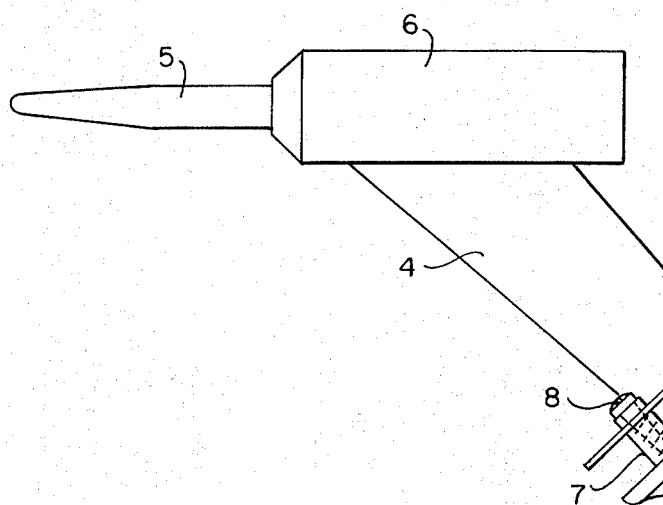
FIG. 2
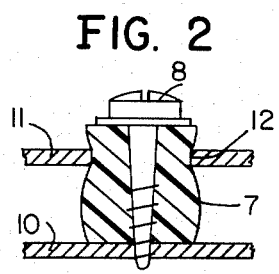
FIG. 3
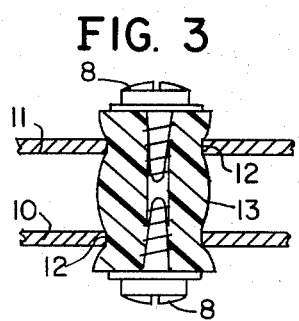
FIG. 4
FIG. 5
FIG. 6
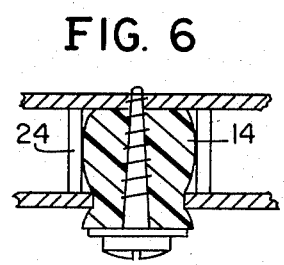
FIG. 7
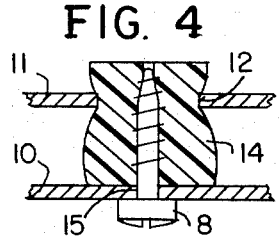
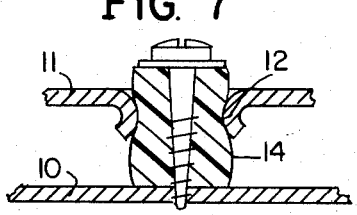
INVENTOR
GORAN YGFORS
BY
Silverman & Cass
ATTYS.

HEAT INSULATING DEVICE FOR FASTENING TWO METALLIC MEMBERS OR OTHER OBJECTS TO EACH OTHER

The present invention relates to a heat insulating device for fastening two metallic members or other objects to each other. A device according to this invention is especially suitable for use in soldering irons in which a metallic member which supports the electrically heated soldering tip is fastened to a non-metallic member connected to the shaft. Usually, each of said members has the shape of a flange.

In an attempt to prevent heat conduction between the metallic member and the shaft part, the flange of the metallic member and the flange of the shaft part usually are positioned at some distance from each other. In known soldering irons of this kind, said flanges usually are connected to each other by means of metallic screws which are surrounded by metallic spacing sleeves. In this type of connection, there is, however, a metallic contact exists between the flange of the metallic member and the flange of the shaft part, and therefore there is considerable heat conduction between the metallic member and the shaft part.

The object of the present invention is to provide a device for mechanically connecting two objects to each other by means of a heat insulating connection. The device is especially suitable for connecting the heated part of a soldering iron to the shaft part of said iron.

The invention is the fact that characterized by the fact that a substantially heat resistant bushing which, in the preferred embodiments, is constructed of plastic such as polytetrafluoretylene chloride (trade mark Teflon). The bushing is positioned within a hole in one of two members, and a screw or the like fastener is forced through the bushing such that the bushing is expanded against the walls of the hole to firmly retain the busing within the hole. The screw also retains the second member in proximate relationship to the first with the bushing retained therebetween.

The structure of the invention provides a very stable connection between two objects due to the fact that the bushing is expanded in a hole in at least one of said objects. Because of the fact that the bushing is made of a heat insulating material, the heat conductivity of the connection is very low. In the drawings:

FIG. 1 is a side plan view of a soldering iron with the structure of the invention in position thereon.

FIG. 2 is a sectional view taken through two disc-shaped objects which are fastened to each other by means of the structure according to the invention.

FIGS. 3 to 7 are views similar to FIG. 2, illustrating various modified embodiments of the invention.

In FIG. 1, reference numeral 1 designates the shaft part of a soldering iron. This shaft part is provided with a flange 2 of a heat insulating and sufficiently heat proof material, for example glass fiber reinforced plastic. A second flange of metal is designated 3 this flange is fastened to a metallic part 4 of the soldering iron which part carries the soldering tip 5, which is heated by an electric heater 6. The flanges 2 and 3 are connected to each other by means of a plurality, for example three, of heat insulating bushings 7 which pass through holes provided in the flange 3 the said holes being of approximately the same size as the outer diameter of the bushings. Screws 8, preferably so called self-threading plate screws, are inserted from the free end of each bushing 7 and threaded into the heat insulating flange 2 as shown at 9. The screws 8 have a diameter of a dimension such that when inserted into the bushings, the bushings 7 are expanded against the edges of the holes in the flange 3. Each bushing 7 abuts with one end thereof against the side of the flange 2.

In FIG. 2 there is illustrated the manner in which two disc-shaped objects 10 and 11 are fastened to each other by means of a device which is similar to the device shown in FIG. 1. The disc-shaped objects may for example be metal plates of some kind, for example different parts of a supporting frame of an electronic device, and said objects are to be kept in a heat insulating connection with each other. A bushing 7 is positioned with one end thereof abutting against one of the objects 10 and the other end of the bushing is positioned so as to penetrate a hole 12 in the other object 11. A screw 8 is inserted from the free end of the bushing and threaded into the object 10. The screw is of such a size and is tightened to such an extent that the bushing is expanded against the wall of the hole 12, this being illustrated in FIG. 2 on a somewhat exaggerated scale. By placement of a sufficient number, for example two, three or more bushings 7, with screws 8, the object 11 will be retained firmly against the object 10 in heat insulating relationship thereto and there will be no direct heat conducting path between said objects. In certain cases it is preferable to provide a washer under the head of the screw 8, as illustrated.

In FIG. 3, there is illustrated a modified embodiment of the structure shown in FIG. 2. In this modification there is, just as in FIG. 2, two disc-shaped objects 10 and 11 which are retained proximate to each other by means of heat insulating connections. Each connection includes a bushing 13 which in this case penetrates both of the objects 10, 11 through holes 12 provided therein. A pair of screws 8 are threaded one from each end of the bushing 13, respectively, into the bushing. The length of the two screws 8 is such that neither makes contact with the other an air-gap is provided between the points of the screws, said air-gaps being located approximately at the middle part of each bushing. The screws 8 are of such diameter that they will expand the bushing against the walls of the holes 12 and keep the objects 10, 11 fastened to each other. In the device according to FIG. 3 there is, as will be apparent from the figure, heat insulation in three places viz. in the transition between the object 10 and the lowermost screw 8, in the transition between the both screws and in the transition between the upper screw 8 and the object 11. A connection of this kind has a very low heat conduction. The device is, however, not of as great a mechanical stability as the device illustrated in FIG. 2, because there is no metallic part which goes through the whole device.

In FIG. 4, another modification of the invention is illustrated. In this case there is a bushing 14, one end of which abuts against a disc-shaped object 10 which is connected by means of a heat insulating connection to another object 11. A screw 8 is inserted from the outside of the object 10 through an unthreaded hole 15. The screw is threaded into the bushing 14 such that the bushing is expanded at the point at which it penetrates a hole 12 provided in object 11. The expansion is such that the bushing fits tightly in the hole 12 and therefore firmly retains the object 10 in place. The device constructed according to FIG. 4 is a good substitution for the device constructed according to FIG. 2, if one of the objects, for example the object 10, is constructed of a relatively thin sheet metal.

In FIG. 5, there is illustrated a further modification of the invention. A bushing 16 penetrates holes 12 in two disc-shaped objects 10 and 11. A screw 17 passes through the bushing 16 and extends beyond the objects 10, 11. The screw 17 is provided with a head 18 at one end thereof and with a threaded portion 19 at the other end thereof to receive a nut 20. The nut 20 is provided with a head which has a groove 21 to facilitate tightening by a screw driver. The dimension of the diameter of screw 17 is greater than the central passageway in the bushing such that when the nut 20 is firmly tightened, the bushing 16 will expand against the walls of the holes 12, and by this means the objects 10 and 11 are retained together.

In the embodiment illustrated in FIG. 5, the screw 17 and the nut 20 are provided with conical parts 22 and 23 respectively. By means of these conical parts a more efficient expansion of the bushing 16 is obtained, so that a powerful clamping of the material of the bushing against the walls of the holes 12 is achieved.

In the device according to FIG. 5, there are two heat insulating transitions in the connection between the two objects 10 and 11, viz. one transition between the object 10 and the screw 17 and another transition between the screw 17 and the object 11.

In order to avoid any risk that the material of the bushing will be damaged if the disc-shaped objects 10 and 11 are made from relatively thin metal sheet, the hole 12 may be provided with a folded rim as illustrated in FIG. 7, in which an object 11 is provided with a hole 12 and the material around the hole 12 is folded down and back so that there is a rounded surface against which the bushing 14 is pressed.

In FIG. 6 an alternate embodiment is illustrated in which the distance between the objects fastened to each other is exactly defined. According to this embodiment the bushing 14, within the space between the two objects, is surrounded by a spacer tube 24 of hard material, for example ceramic or mica. The spacer tube 24 should have an inner diameter of such a size that the bushing 14 can freely expand sufficiently within said diameter.

What I claim is:

1. A device for mechanically connecting two objects in spaced-apart heat-insulating condition, at least one of said objects having a hole provided therein, said device comprising, a cylindrical bushing constructed of resilient heat resistant material, said bushing positioned between said objects and passing through said hole to extend at least partially beyond the surface of said one object and juxtaposed the surface of said other object, the bushing having a central passageway provided therein and opening at both ends thereof, and screw means positioned within said passageway, said screw means having a head and a shank, the shank having a cross-sectional dimension greater than that of said passageway, the screw means being positioned with said head adjacent the bushing part which extends beyond the surface of said one object such that the bushing is expanded within said hole to make contact with the walls thereof and to assume a bulged condition on both sides of said one object, and the shank being in threaded engagement with said other object to secure said bushing to said other object.

2. A device as claimed in claim 1 in which the walls of said one object which define the hole are rounded.

3. A device for mechanically connecting two objects in spaced-apart heat-insulating condition, at least one of said objects having a hole provided therein, said device comprising, a cylindrical bushing constructed of resilient heat resistant material, said bushing positioned between said objects and passing through said hole to extend at least partially beyond the surface of said one object, the bushing having a central passageway provided therein and opening at both ends thereof, and screw means positioned within said passageway,, said screw means having a cross-sectional dimension greater than that of said passageway such that the bushing is expanded within said hole to make contact with the walls thereof and to assume a bulged condition on both sides of said one object, said bushing being juxtaposed the surface of said other object and secured to said other object by said screw means, said screw means being in threaded engagement only with said other object and not with said one object.

4. A device for mechanically connecting two objects in spaced-apart heat-insulating condition, at least one of said objects having a hole provided therein, said device comprising, a cylindrical bushing constructed of resilient heat resistant material, said bushing positioned between said objects and passing through said hole to extend at least partially beyond the surface of said one object and juxtaposed the surface of said other object, the distance between said objects being defined by a spacer tube of hard heat-insulating material with the bushing being surrounded by said spacer tube, the bushing having a central passageway provided therein and opening at both ends thereof, and fastening means positioned within said passageway, said fastening means having a head and a shank, the shank having a cross-sectional dimension greater than that of said passageway, the fastening means being positioned with said head adjacent the bushing part which extends beyond the surface of said one object such that the bushing is expanded within said hole to make contact with the walls thereof and to assume a bulged condition on both sides of said one object, and the shank being in engagement with said other object to secure said bushing to said other object.

* * * * *